Figure 1:
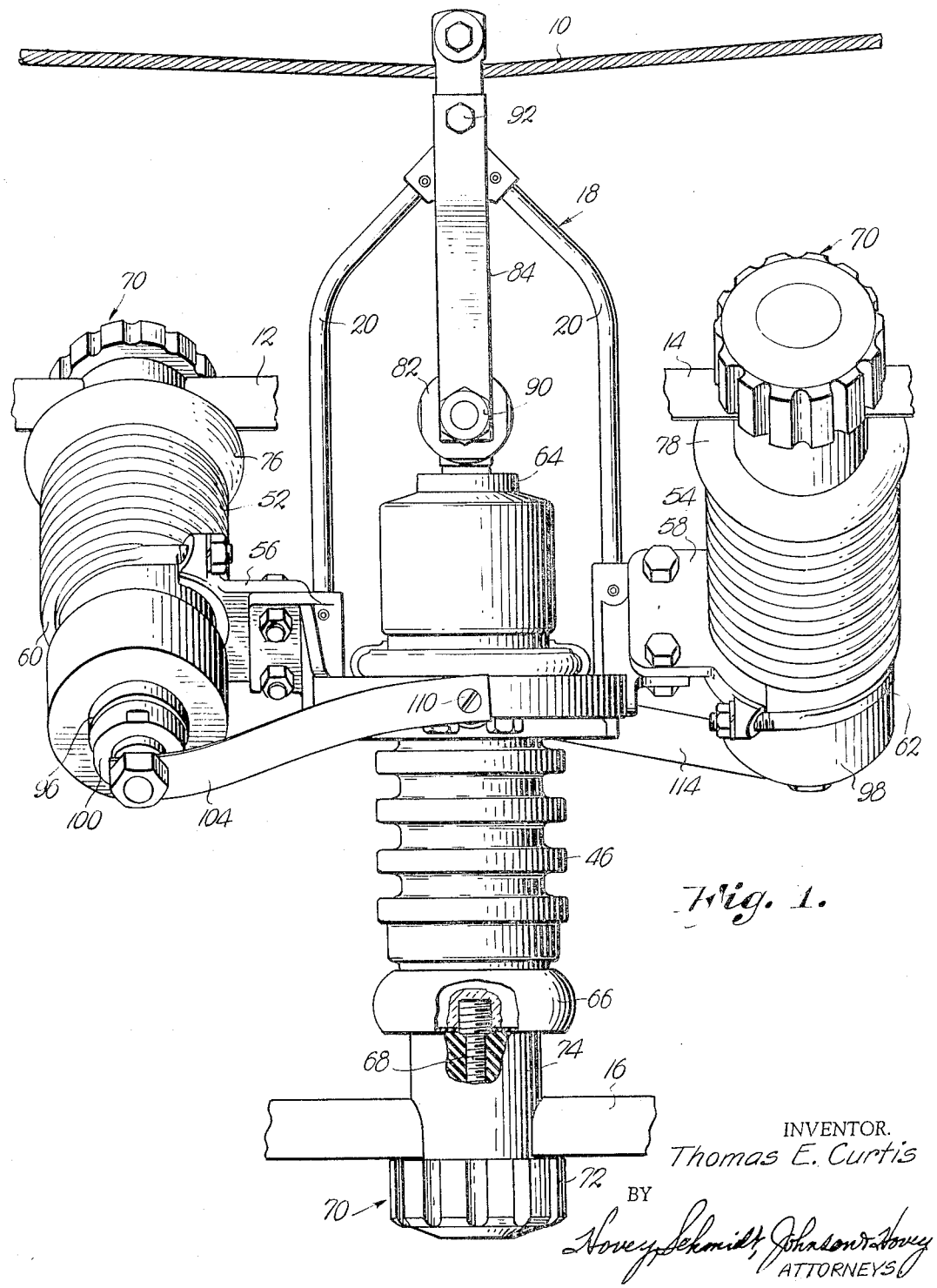

Dec. 27, 1966  T. E. CURTIS  3,294,892
THREE-PHASE CLUSTER MOUNTED LIGHTNING ARRESTOR
Filed July 12, 1965  2 Sheets-Sheet 2

INVENTOR.
Thomas E. Curtis
BY
Hovey, Schmidt, Johnson & Hovey
ATTORNEYS.

United States Patent Office 3,294,892
Patented Dec. 27, 1966

3,294,892
THREE-PHASE CLUSTER MOUNTED
LIGHTNING ARRESTOR
Thomas E. Curtis, Centralia, Mo., assignor to A. B. Chance Company, Centralia, Mo., a corporation of Missouri
Filed July 12, 1965, Ser. No. 471,101
10 Claims. (Cl. 174—2)

This invention relates to a lightning arrestor cluster for use in a three-phase power transmission system as a protective device and as a means for maintaining the three conductors of the system in proper spaced relationship.

In three-phase power distribution systems it is common practice to arrange the three current-carrying conductors (known as spacer cables) in a triangular pattern between the line poles. The use of insulated conductors permits the lines to be relatively closely spaced, thereby eliminating the need for crossarms or other support members on the poles in most instances. However, for lightning protection it has heretofore been the practice to use lightning arrestors mounted on the pole itself which require the use of suitable supporting structure on the pole.

Manifestly, the addition of crossarms or the like to line poles detracts from the appearance of the poles and renders the presence of the transmission system more evident. Utilities are becoming increasingly aware of the appearance of their transmission lines because of public objection to unsightly pole structure. Thus, every effort is being made to eliminate the necessity of employing crossarms or other supporting members in order to avoid the expense of changing to underground cable systems in response to public pressure.

It is, therefore, an important object of the instant invention to provide a lightning arrestor cluster for use with three-phase spacer cables that does not require a pole mounting, and which occupies a sufficiently small space to permit the assembly to be positioned within the three conductors and electrically coupled thereto.

As a corollary to the foregoing object, it is another important aim of this invention to provide such an assembly which will also serve to maintain the three conductors in proper spaced-apart relationship to prevent shorting of the conductors by wind whip.

An additional object of the invention is to provide such an assembly which utilizes three elongated lightning arrestor units mounted with their longitudinal axes spaced apart longitudinally of the conductors to provide a balanced cluster.

A further object of the instant invention is to provide an arrestor cluster as aforesaid wherein each arrestor unit is provided with a current-responsive, explodable isolator having novel interrupter switch means coupled therewith for augmenting the action of the isolator upon fragmentation thereof by excessive currents.

Other objects will become apparent as the detailed description proceeds.

Figure 2:
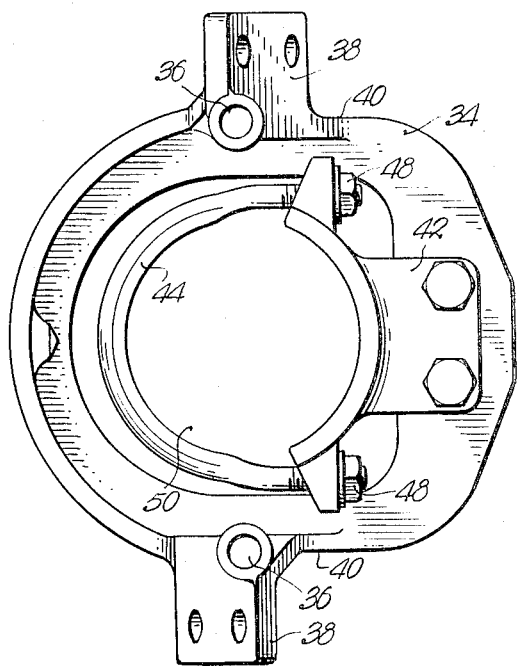
Figure 3:
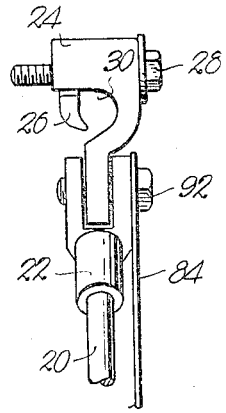
Figure 4:
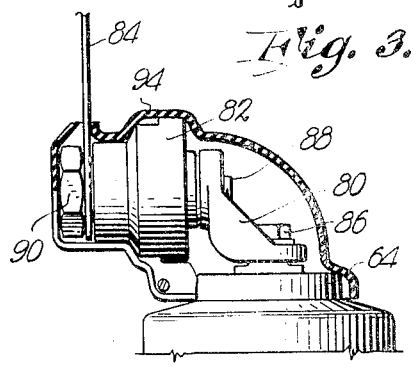
Figure 5:
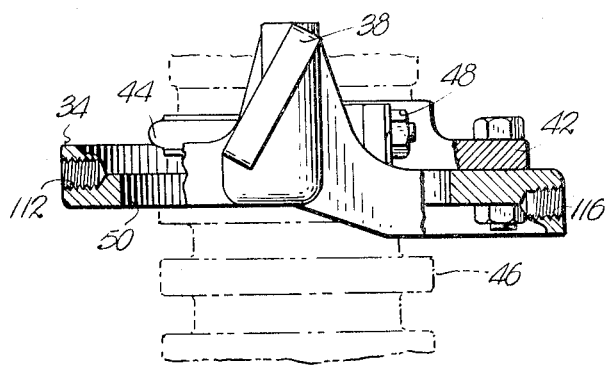
Figure 6:
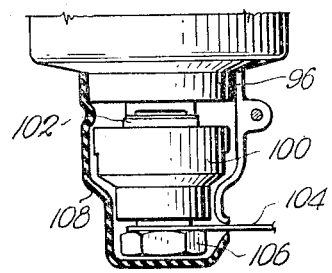

In the drawings:
FIGURE 1 is a side elevational view of the instant invention showing the same in place within a three-conductor, three-phase transmission line;
FIG. 2 is a detailed plan view of the central support plate and the bracket for the upright arrestor unit;
FIG. 3 is a fragmentary, detailed view showing the upper portion of the hanger assembly;
FIG. 4 is a detailed view of the upper terminal of the upright arrestor unit showing the isolator therefor;
FIG. 5 is an elevational view of the structure shown in FIG. 2, a portion of the body of the arrestor unit being illustrated in broken lines; and
FIG. 6 is a fragmentary view showing the inner terminal of one of the two inclined arrestor units and illustrating the isolator therefor.

The numeral 10 designates a steel messenger cable which may be strung between adjacent line poles (not shown) and which is maintained at ground potential by a suitable ground connection at one of the poles. Three stranded, insulated conductors 12, 14 and 16 are disposed below messenger 10 in a triangular pattern and comprise the conductors of a three-phase transmission system. Although the drawings do not show the conductors as viewed in a plane extending transversely thereof, it should be understood that the three conductors define the apexes of an equilateral triangle.

A hanger assembly, generally designated 18, is provided with a pair of rods 20 which depend from a hanger member 22 (FIG. 3) which is bifurcated at its upper end to receive a clamp body 24. A jaw 26 is shiftable in body 24 by a bolt 28 threaded in jaw 26, messenger 10 being received by the opening 30 defined by the jaw and an arcuate portion 32 of the clamp body.

The lower ends of the rods 20 are secured to a base or support plate 34 of generally circular configuration (FIG. 2). The lower ends of the rods are received by recesses 36 in a pair of opposed, laterally extending ears 38 integral with the opposed side margins 40 of plate 34.

A bracket 42 is secured to the upper surface of plate 34 and includes a synthetic resin coated U-bolt 44 which tightly engages the insulated body of an elongated lightning arrestor unit 46 (FIG. 5) by virtue of nuts 48 threaded over the ends of the bolt. It may be seen that plate 34 has a central, vertical opening 50 therethrough receiving unit 46 and permitting mounting of the same in an upright position by the clamping action of U-bolt 44.

Lightning arrestor units 52 and 54 are secured to respective ears 38 by brackets 56 and 58 identical in construction to bracket 42. As is clear from a comparison of FIGS. 1 and 2, nuts and bolts are utilized to secure brackets 56 and 58 to ears 38, bracket 56 being provided with a U-bolt 60 in clamping engagement with the insulated body of unit 52, while bracket 58 is provided with a U-bolt 62 in clamping engagement with the insulated body of arrestor 54.

As may be seen in FIG. 5, the ear 38 there shown forms supplemental angles of 120° and 60° with the major plane of plate 34. Bracket 56 mounts unit 52 on ear 38 with the longitudinal axis of the unit extending in perpendicular relationship to the plane of the ear; therefore, units 52 and 46 have an angular spacing of 120°. Likewise, units 54 and 46 have an angular spacing of 120° since the ear 38 to which bracket 58 is secured forms supplemental angles of 60° and 120° with the major plane of plate 34 in the opposite sense (see FIG. 2).

Each lightning arrestor unit is provided with a pair of terminals at respective ends thereof which are connected in series between a conductor and the grounded messenger 10. Referring to FIG. 1, unit 46 is shown having an electrically conductive cap 64 at its upper end, and a conductive sleeve 66 at its lower end. Cap 64 and sleeve 66 form the terminals of unit 46, the lower end of the unit being provided with a threaded stud 68 which is received by a conductor clamp assembly 70.

Assembly 70 is a conventional and commercially available device having an internal piercing stud (not shown) which is embedded in conductor 16 as the knurled clamping member 72 of assembly 70 is tightened. Member 72 is threaded over the body portion 74 of the assembly, portion 74 having a groove therein which receives conductor 16 as member 72 is tightened on portion 74 to force the piercing stud through the insulated covering of conductor 16 and into electrical contact with the stranded wires therewithin.

In similar fashion, the outer ends of units 52 and 54 are provided with sleeves 76 and 78, respectively, which form one of the terminals of the units. Two additional clamping assemblies 70 are mounted on sleeves 76 and 78 in the same manner as described above for arrestor unit 46, thereby securing conductors 12 and 14 to arrestor units 52 and 54 respectively.

To form a conductive path from conductor 16 to messenger 10 during operation of unit 46, terminal cap 64 is electrically coupled with hanger member 22 via conductive angle bracket 80, isolator 82, and element 84, the latter comprising a flexible, metallic strip or strap (FIGS. 3 and 4). The lower end of bracket 80 is secured to cap 64 by a bolt 86, the upper end thereof threadably receiving a stud 88 which forms a part of the isolator 82. A nut 90 on the opposite end of the isolator secures the lower extremity of element 84 thereto, the upper end of the element being attached to hanger member 22 by a bolt 92 which also serves to interconnect the bifurcated upper portion of hanger member 22 and clamp body 24. The protective cover 94 shields the isolator and its associated components from the effects of adverse weather.

As illustrated in FIG. 1, element 84 is flexed between bolt 92 and nut 90 in a direction to cause element 84 to separate from the isolator by return flexure when the lowermost end of the element is no longer anchored to the isolator. (Note that in FIG. 1 cover 94 is removed for clarity.) Isolator 82 is a conventional device having an explosive charge therein which effects fragmentation of the body of the isolator if the current therethrough reaches a predetermined value in excess of normal arrestor operating current. Thus, when the isolator explodes, element 84 moves away from the isolator to augment the circuit-interrupting action thereof by establishing a relatively large air gap between the grounded element and terminal 64.

In FIG. 1, it may be seen that arrestor units 52 and 54 are provided with caps 96 and 98, respectively, at their inner ends which form the other terminals of these units. Unit 52 is provided with an isolator 100 of the same type as isolator 82, the attachment of isolator 100 to unit 52 being illustrated in FIG. 6. Unit 54 is also provided with an isolator, but this structure is not visible in the drawings.

Isolator 100 is secured to cap 96 by a link 102, a flexible element 104 in the form of a strip or strap being connected to the lower end of the isolator by a nut 106. Isolator 100 is shielded by a protective cover 108, the latter being removed from the showing of FIG. 1 for clarity.

Element 104 extends from isolator 100 to plate 34 and is secured to the latter by a screw 110 received by a tapped opening 112 in the peripheral edge of the plate. In like manner, a flexible element 114 is secured to the opposite edge of plate 34 by a screw (not shown) received in tapped hole 116, element 114 extending from plate 34 to the isolator of arrestor unit 54. The isolator and associated components of arrestor 54 are indentical to that as shown in FIG. 6 for arrestor 52.

FIG. 1 clearly shows that elements 104 and 114 are flexed to provide a positive separation of each element from its associated isolator upon fragmentation of the latter. Since plate 34 and hanger assembly 18 are electrically conductive, the current paths from conductors 12 and 14 to ground during arrestor operation are in shunt relationship to element 84 so that each arrestor unit operates independently. Thus, for example, if lightning should strike conductor 12, current would flow through arrestor 52, isolator 100, element 104, plate 34, rods 20, hanger member 22, clamp 24, and thence along messenger 10 to ground. If conductor 16 is struck by lightning, a current path is provided through arrestor 46, isolator 82, element 84, hanger member 22, and clamp 24 to ground along messenger 10. The use of a synthetic resin coating on the U-bolts 44, 60 and 62 aids in preventing the possibility of the establishment of a current path through the brackets 42, 56 and 58 and also renders the bolts resistant to corrosion.

Having thus described the invention, what is claimed as new and desired to be secured by Letters Patent is:

1. In a power transmission system provided with three current-carrying conductors disposed in a triangular pattern, the combination with said conductors of:
    a base;
    three elongated arrestor units each having a pair of opposed ends and extending from said base in directions to dispose their outer ends in a triangular configuration; and
    support structure adapted for connection to an earth ground, said structure being coupled with said base and positioning the latter in said pattern,
    said base being provided with means securing said units thereto with the longitudinal axes thereof spaced apart longitudinally of said conductors,
    each of said units being provided with a first terminal at the outer end thereof connecting the unit with a corresponding conductor, and a second terminal electrically coupled with said structure.

2. The invention of claim 1, wherein adjacent units extend from said base at an angular spacing of approximately 120°.

3. The invention of claim 1, wherein said securing means positions the units with said axes disposed in spaced, parallel planes.

4. The invention of claim 1, wherein the second terminal of each unit is at the inner end thereof, and wherein is provided an explodable arrestor isolator mounted on the inner end of each of said units respectively, and electrically coupled in series between the second terminal thereof and said structure.

5. A lightning arrestor cluster for use with three current-carrying conductors disposed in a triangular pattern, said cluster comprising:
    a support plate having opposed, lateral margins and a central opening therethrough between said margins;
    three elongated arrestor units each having a pair of opposed ends;
    means on said plate securing one of said units thereto with one end of said one unit extending through said opening;
    means attaching the other two units to respective margins of said plate in outwardly extending relationship thereto with the outer ends of said two units defining a triangle with the other end of said one unit; and
    support structure adapted for connection to an earth ground and coupled with said plate for positioning the latter in said pattern with said units spaced longitudinally of said conductors,
    each of said units being provided with a first terminal at the triangle-defining end thereof for connecting the unit with a corresponding conductor, and a second terminal electrically coupled with said structure.

6. The invention of claim 5, wherein said securing means includes a bracket mounting said one unit with the longitudinal axis thereof in substantially perpendicular relationship to the major plane of the plate, said attaching means including a pair of brackets mounting said other two units with the longitudinal axes thereof defining angles of approximately 30° and 150°, respectively, with said major plane, whereby to provide an angular spacing between adjacent units of approximately 120°.

7. The invention of claim 5, wherein said structure includes a messenger adapted for disposition above said conductors and a hanger assembly depending from said messenger and coupled with said plate to suspend the latter with the major plane thereof extending horizontally and with said one end of said one unit disposed between the messenger and the plate.

8. A lightning arrestor cluster for use with three current-carrying conductors disposed in a triangular pattern, said cluster comprising:

a messenger adapted for connection to an earth ground and for disposition above said conductors;

an electrically conductive, horizontal support plate having opposed lateral margins;

an electrically conductive hanger assembly depending from said messenger and coupled with said plate for suspending the latter in said pattern with said margins spaced longitudinally of said conductors;

three elongated arrestor units each having a pair of opposed ends, said plate having a central opening therethrough between said margins receiving one of said units in an upright disposition with one end of said one unit extending upwardly through said opening;

means on said plate coupled with said one unit between the ends thereof and securing the one unit to the plate;

means attaching the other two units to respective margins of said plate in outwardly extending relationship thereto with the outer ends of said two units defining a triangle with the other end of said one unit, each of said units being provided with a first terminal at the triangle defining end thereof for connecting the unit with the corresponding conductor;

an explodable arrestor isolator operably coupled with each of said units respectively, said one unit having a second terminal at said one end thereof mounting its associated isolator thereon, said other two units having second terminals at the inner ends thereof mounting respective isolators thereon;

a first, flexed, electrically conductive element interconnecting said hanger assembly and the isolator of said one unit and normally establishing electrical continuity between the one unit and said messenger through the last-mentioned isolator; and second and third flexed, electrically conductive elements extending between respective isolators of the other two units and said plate and normally establishing electrical continuity between the other two units and said messenger through their associated isolators, each of said elements being disposed for movement away from its associated isolator by return flexure upon disconnection therefrom, whereby fragmentation of one of the isolators releases its associated element for movement of the latter to a circuit-interrupting position spaced from the second terminal of the corresponding unit.

9. In a power transmission system provided with three current-carrying conductors disposed in a triangular pattern, the combination with said conductors of:

a mounting structure;

three elongated arrestor units each having a pair of opposed ends and extending from said structure in directions to dispose their outer ends in a triangular configuration; and a support adapted for connection to an earth ground, said support being coupled with said structure and positioning the latter adjacent said conductors between a pair of spaced planes extending through a respective pair of said conductors longitudinally thereof, said structure being provided with means securing said units thereto with the longitudinal axes thereof spaced apart longitudinally of said conductors, each of said units being provided with a first terminal at the outer end thereof connecting the unit with a corresponding conductor, and a second terminal electrically coupled with said support.

10. In a power transmission system provided with three generally horizontal, current-carrying conductors disposed in a triangular pattern, whereby two of said conductors define the lateral apexes of the pattern, the combination with said conductors of:

a mounting structure;

three elongated arrestor units each having a pair of opposed ends and extending from said structure in directions to dispose their outer ends in a triangular configuration; and a support adapted for connection to an earth ground, said support being coupled with said structure and positioning the latter adjacent said conductors between a pair of spaced, upright planes extending through respective lateral apexes longitudinally of said conductors, said structure being provided with means securing said units thereto with the longitudinal axes thereof spaced apart longitudinally of said conductors, each of said units being provided with a first terminal at the outer end thereof connecting the unit with a corresponding conductor, and a second terminal electrically coupled with said support.

References Cited by the Examiner
FOREIGN PATENTS 1,175,318  11/1958  France.

LARAMIE E. ASKIN, *Primary Examiner.*